US011330181B2

United States Patent
Byun et al.

(10) Patent No.: US 11,330,181 B2
(45) Date of Patent: May 10, 2022

(54) METHOD FOR TRANSMITTING DATA IN CAMERA MODULE

(71) Applicant: Dongwoon Anatech Co., Ltd., Seoul (KR)

(72) Inventors: Jae Hyeok Byun, Seoul (KR); Jung Ho Jin, Seoul (KR); Jin Park, Seoul (KR)

(73) Assignee: Dongwoon Anatech Co., Ltd., Seoul (KR)

( * ) Notice: Subject to any disclaimer, the term of this patent is extended or adjusted under 35 U.S.C. 154(b) by 321 days.

(21) Appl. No.: 16/616,628

(22) PCT Filed: May 15, 2018

(86) PCT No.: PCT/KR2018/005530
§ 371 (c)(1),
(2) Date: Nov. 25, 2019

(87) PCT Pub. No.: WO2018/221874
PCT Pub. Date: Dec. 6, 2018

(65) Prior Publication Data
US 2020/0195849 A1  Jun. 18, 2020

(30) Foreign Application Priority Data
May 31, 2017  (KR) .................. 10-2017-0067935

(51) Int. Cl.
*H04N 5/232* (2006.01)
*G03B 5/04* (2021.01)

(52) U.S. Cl.
CPC ........... *H04N 5/23287* (2013.01); *G03B 5/04* (2013.01); *G03B 2205/0015* (2013.01)

(58) Field of Classification Search
CPC .................. H04N 5/23287; G03B 5/04; G03B 2205/0015
See application file for complete search history.

(56) References Cited

U.S. PATENT DOCUMENTS 10,935,947 B2 * 3/2021 Lee .................. G03B 5/00
11,178,331 B2 * 11/2021 Kim ................. G03B 5/00
(Continued)

FOREIGN PATENT DOCUMENTS

CN  101470317 A  7/2009
CN  102231839 A  11/2011
(Continued)

OTHER PUBLICATIONS

International Search Report PCT/ISA/210 for International Application No. PCT/KR2018/005530 dated Sep. 10, 2018.
(Continued)

*Primary Examiner* — Clayton E. LaBalle
*Assistant Examiner* — Diana Hancock
(74) *Attorney, Agent, or Firm* — Harness, Dickey & Pierce, P.L.C.

(57) ABSTRACT

The present invention relates to a method for transmitting data in a camera module which transmits data necessary for camera shake correction, and the present invention comprises a first step in which each actuator movement detection element sequentially transmits the axial movement distance detection data detected through a Hall sensor in a two-wire interface manner without correction after each specified time delay, in a first transmission section in which each piece of axial movement distance detection data of the actuator has to be transmitted to a controller module for a shake correction; and a second step in which each actuator movement detection element sets just the variation between previously transmitted axial movement distance data and currently detected axial movement distance detection data as each piece of axial movement distance detection data with respect to each axis and sequentially transmits in the two-wire manner after the same specified time delay, respectively, in a transmission section after the first transmission period.

14 Claims, 12 Drawing Sheets

(56) References Cited

U.S. PATENT DOCUMENTS

| | | |
|---|---|---|
| 2007/0217774 A1 | 9/2007 | Nagaishi et al. |
| 2011/0176015 A1 | 7/2011 | Yun |
| 2013/0238278 A1 | 9/2013 | Shoemaker et al. |
| 2016/0173783 A1 | 6/2016 | Kim et al. |
| 2016/0316145 A1* | 10/2016 | Kang ................ H04N 5/23287 |
| 2017/0359518 A1* | 12/2017 | de Foras ............ H04N 5/23258 |

FOREIGN PATENT DOCUMENTS

| | | |
|---|---|---|
| CN | 103575210 A | 2/2014 |
| CN | 105378555 A | 3/2016 |
| JP | H07-261224 A | 10/1995 |
| JP | 2006-317858 A | 11/2006 |
| JP | 2007-158664 A | 6/2007 |
| JP | 2010-022061 A | 1/2010 |
| JP | 2013-088706 A | 5/2013 |
| JP | 2013-175128 A | 9/2013 |
| JP | 2014-025791 A | 2/2014 |
| JP | 2015-022215 A | 2/2015 |
| JP | 2016-214380 A | 12/2016 |
| JP | 2016-220254 A | 12/2016 |
| JP | 2017-523462 A | 8/2017 |
| KR | 10-2014-0036696 A | 3/2014 |
| KR | 10-2016-0095911 A | 8/2016 |
| KR | 10-2017-0024671 A | 3/2017 |
| WO | WO-2016/003103 A1 | 1/2016 |

OTHER PUBLICATIONS

Notice of Refusal issued in Japanese Patent Application No. 2020-515642 dated Dec. 8, 2020. English translation has been provided.
Chinese Office Action issued in Chinese Patent Application No. 201880036445.1 dated Jan. 5, 2021. English translation has been provided.

* cited by examiner

METHOD FOR TRANSMITTING DATA IN CAMERA MODULE

CROSS-REFERENCE TO RELATED APPLICATIONS

This application is a national phase under 35 U.S.C. § 371 of PCT International Application No. PCT/KR2018/005530 which has an International filing date of May 15, 2018, which claims priority to Korean Patent Application No. 10-2017-0067935, filed May 31, 2017, the entire contents of each of which are hereby incorporated by reference.

TECHNICAL FIELD

This invention relates to a camera module, and more particularly, to a method of transmitting data in a camera module which transmits data necessary for camera shake correction.

BACKGROUND ART

In portable devices equipped with camera modules, as mobility and portability increase, there occurs a phenomenon in which images are disturbed due to minute vibrations or shaking generated by a human body. As measures for obtaining clear images, camera modules equipped with shake correction devices (or technologies) have become common. The shake correction devices (technologies) are classified into digital image stabilization (DIS) methods, electronic image stabilization (EIS) methods, and optical image stabilization (OIS) methods. In terms of performance, the OIS methods are widely used.

In a shake correction device using an OIS method, a Hall sensor is basically used to receive feedback of a movement distance of an actuator (or a carrier in a narrow sense). That is, it can be regarded that Hall sensors on X and Y axes and an analog front end (AFE) and a shake corrector (an OIS controller), which are configured to pre-process signals output from the Hall sensors, constitute the shake correction device. The AFE and the shake corrector (the OIS controller) are included in a single integrated circuit (IC) chip (which is also referred to as an OIS controller IC). As described above, as shown in FIG. 1, when the AFE and the shake corrector (the OIS controller) are included in a single IC chip, in order to connect Hall sensors 10 and 20 to an OIS controller IC 30, seven pins for VHX, XH+, XH−, VHY, YH+, YH−, and a common GND are required. As shown in FIG. 2, in order to drive an actuator of a camera module, four driver connection pins P1 to P4 are required so that a total of eleven pins and lines for connecting the eleven pins should be formed in a flexible circuit board (FPCB). For reference, in FIG. 2, A and B represent the Hall sensors on the X and Y axes, respectively.

When axes for controlling a camera module increases, the number of the Hall sensors increases accordingly, and the number of pins for connecting the increased number of the Hall sensors to a peripheral circuit also increases. Minimizing output pins of the Hall sensors required to control the camera module and driver connection pins for driving an actuator of the camera module may contribute to not only providing convenience in designing and manufacturing a FPCB which connects the camera module to the OIS controller IC, but also reducing a manufacturing cost. Therefore, a new method is urgently needed to minimize the number of physical pins for connecting the camera module to the OIS controller IC.

Meanwhile, shake correction performance and auto-focusing performance are affected by a temperature inside the camera module. A gain, i.e., sensitivity of a Hall sensor, which senses a movement distance of the actuator in x- and y-axis directions perpendicular to an optical axis (a z-axis) direction of the actuator to which a lens assembly is coupled, is varied according to a temperature variation so that a magnitude of an output voltage of the Hall sensor is also varied. Further, a magnet is used to detect the movement distance of the actuator using the Hall sensor. As the temperature inside the camera module varies, performance of the magnet is also varied. Consequently, a system loop gain is varied such that OIS performance is degraded. In addition, in the case of the optical axis of the actuator, a lens is affected due to the temperature variation such that a problem occurs in that auto focusing is not performed normally.

A two-wire interface method may be employed as a measure for overcoming the above limitations as well as minimizing the number of physical pins connecting the camera module to the OIS controller IC. In this case, when information (e.g., temperature information in the camera module) which should be additionally transmitted is increased, the additional information may not be completely transmitted due to a data rate limitation of the two-wire interface method. Therefore, a new method which is capable of satisfying a data transmission standard of the two-wire interface method and transmitting data normally without loss of information, which should be transmitted between a camera module and an OIS controller module, is needed.

RELATED ART DOCUMENT

Patent Document (Patent Document 1) Korean Patent Laid-Open Publication No. 10-2014-0036696
(Patent Document 2) Korean Patent Laid-Open Publication No. 10-2016-0095911

SUMMARY OF INVENTION

Technical Problem

The present invention is directed to providing a method of transmitting data in a camera module which is capable of minimizing the number of physical connection pins for data transmission between a camera module and a controller module for optical image stabilization (OIS) and transmitting data without loss of information which should be transmitted.

The present invention is also directed to providing a method of transmitting data in a camera module which is capable of minimizing the number of physical connection pins for data transmission between a camera module and shake correction and transmitting a position of an actuator, which is detectable within the camera module, and a temperature in the camera module without loss.

The present invention is also directed to providing a method of transmitting data in a camera module which is capable of transmitting and receiving normally newly added information or data without additional increasing of a communication rate while following a transmission standard of a two-wire interface method.

Solution to Problem

One aspect of the present invention provides a method of transmitting data in a two-wire interface method by a plurality of actuator movement sensing elements, each having a Hall sensor for sensing a movement distance of an actuator in an optical axis (z-axis) or any one direction of an x-axis direction and a y-axis direction perpendicular to the optical axis (z-axis) of the actuator to which a lens assembly is coupled and by a control module for shake correction, the method including, in a first transmission section in which each piece of axial movement distance sensing data of the actuator should be transmitted to the controller module for shake correction, a first operation of delaying, by each of actuator movement sensing element, axial movement distance sensing data sensed by the Hall sensor for a specified time without correction and then sequentially transmitting the axial movement distance sensing data in the two-wire interface method, and, in a subsequent transmission section next to the first transmission section, a second operation of setting, by each of actuator movement sensing element, only an increment between previously transmitted axial movement distance sensing data in each axis and currently sensed axial movement distance sensing data as each piece of axial movement distance sensing data, delaying each piece of axial movement distance sensing data for the specified time, and then sequentially transmitting each piece of axial movement distance sensing data in the two-wire interface method.

Further, when a temperature sensing element is included in a camera module, in the first operation, temperature sensing data sensed by the temperature sensing element may be transmitted following each piece of axial movement distance sensing data without correction, and, in the second operation, only an increment with respect to previously transmitted temperature sensing data may be transmitted following each piece of axial movement distance sensing data.

In the method of transmitting data in a camera module, each axial direction of the actuator may be the x-axis or y-axis direction perpendicular to the optical axis (z-axis) direction of the actuator to which the lens assembly is coupled, and pieces of axial movement distance sensing data in the x-axis and y-axis may be sequentially transmitted in the first and second operations.

Each axial direction of the actuator may be the x-axis or y-axis direction perpendicular to the optical axis (z-axis) direction of the actuator to which the lens assembly is coupled, and pieces of axial movement distance sensing data in the x-axis, y-axis, and z-axis may be sequentially transmitted in the first and second operations.

Each axial direction of the actuator may be the x-axis or y-axis direction perpendicular to the optical axis (z-axis) direction of the actuator to which the lens assembly is coupled, and pieces of axial movement distance sensing data in the x-axis, z-axis, and y-axis may be sequentially transmitted in the first and second operations.

In the above-described method of transmitting data, slave addresses of the plurality of actuator movement sensing elements may have the same address.

When the increment of the axial movement distance sensing data exceeds a set threshold in the second operation of the above-described method of transmitting data, the set threshold may be repeatedly transmitted or the detected axial movement distance sensing data may be repeatedly transmitted instead of the increment and then the increment with respect to the previously transmitted temperature sensing data may be subsequently transmitted.

Advantageous Effects of Invention

Since a data transmission method of the present invention transmits an entirety of the information (e.g., the axial movement distance sensing data and the temperature sensing data), which should be transmitted, at an initial stage (the first transmission section) and then compares previous information with current information to transmit only a varied increment, there is an advantage in that the data transmission method can be free from the need for a faster transmission rate or longer transmission time as the information which should be transmitted is increased.

Further, the data transmission method of the present invention is useful for providing the advantage of transmitting and receiving newly added information or data normally without increasing the communication rate while following the transmission standard of the two-wire interface method which minimizes the physical connection between data transmission entities.

DETAILED DESCRIPTION OF EMBODIMENT

Hereinafter, exemplary embodiments of the present invention will be described in detail with reference to the accompanying drawings. In the following description of the present invention, when related known functions or configurations are determined to obscure the gist of the present invention, a detailed description thereof will be omitted herein. For reference, among terms used in the following description and the accompanying drawings, position XH (YH or ZH) is axial movement distance sensing data of a first transmission section transmitted from actuator movement sensing elements to an optical image stabilization (OIS) controller integrated circuit (IC), and position X (Y or Z) is each piece of axial movement distance sensing data transmitted in a transmission section next to the first transmission section. Position XH (YH or ZH) and position X (Y or Z) are defined as representing increments between previously transmitted axial movement distance sensing data and currently sensed axial movement distance sensing data of each actuator movement sensing element in each axis.

Figure 1:
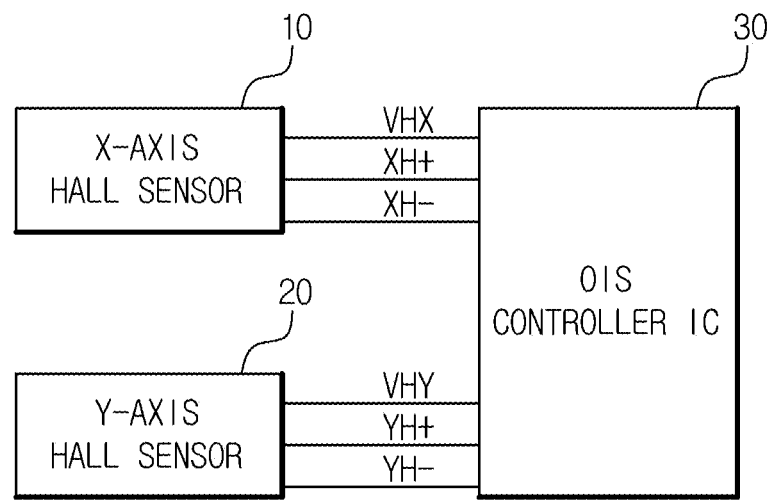
FIG. 1 is a schematic block diagram illustrating a general shake correction device.
Figure 2:
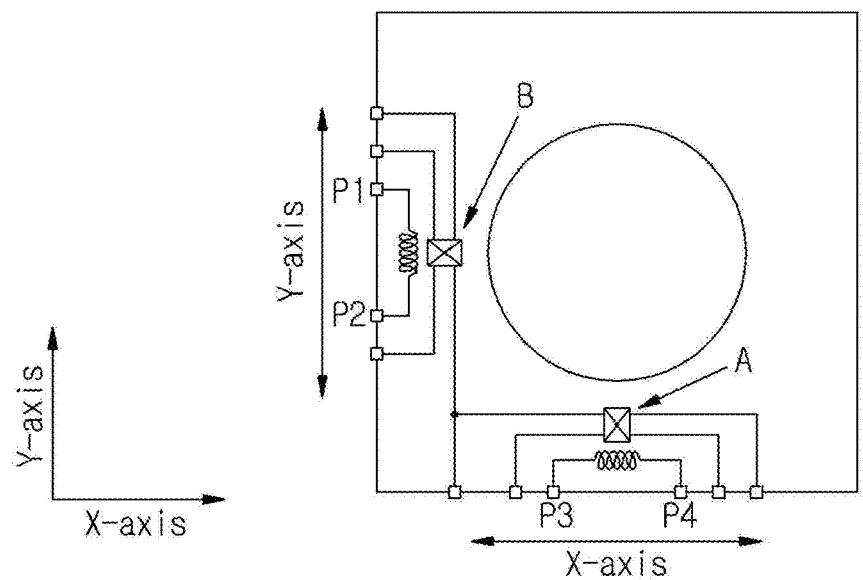
FIG. 2 is an exemplary diagram illustrating a circuit connection of a general camera module.
Figure 3:
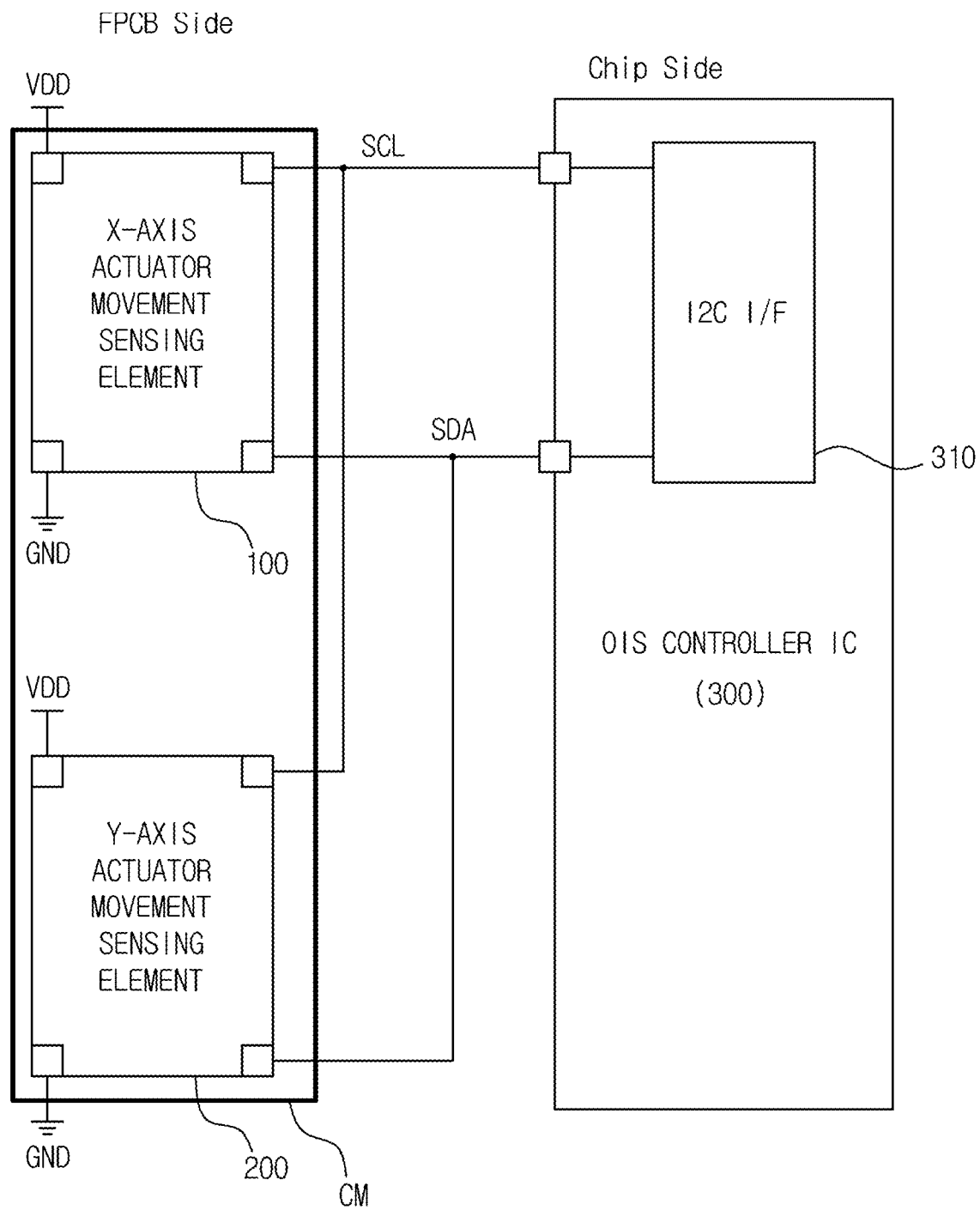
FIG. 3 is an exemplary diagram illustrating a connection state between actuator movement sensing elements constituting a camera module CM and an optical image stabilization (OIS) controller integrated circuit (IC) 300 corresponding to a control module for shake correction according to an embodiment of the present invention.

FIG. 3 is an exemplary diagram illustrating a connection state between actuator movement sensing elements 100 and 200 constituting a camera module CM and an OIS controller IC 300 corresponding to a control module for shake correction according to an embodiment of the present invention.

First, the camera module CM according to the embodiment of the present invention includes an actuator to which a lens assembly is coupled and actuator driving coils MX and MY for driving the actuator and further includes a plurality of actuator movement sensing elements 100 and 200 for detecting movement distances of an actuator in x-axis and y-axis directions perpendicular to an optical axis (z-axis) direction of the actuator to which a lens assembly is coupled and for transmitting the detected movement distances to the OIS controller IC 300 in a two-wire interface (SCL and SDA) method. Alternatively, according to embodiments, the camera module CM may further include an actuator movement sensing element (not shown) in the z-axis direction for detecting a movement distance of the actuator moved in the optical axis direction of the actuator.

The OIS controller IC 300 corresponding to the master controller corrects hand shaking by receiving feedback of movement distances of the actuator moving in one axial direction from the plurality of actuator movement sensing elements 100 and 200 in the two-wire interface method. The OIS controller IC 300 may generate actuator drive control data for driving the actuator and transmit the generated actuator driving control data to the camera module CM in the two-wire interface method.

Referring to FIG. 3, a serial data pin SDA and a serial clock pin SCL of each of the plurality of actuator movement sensing elements 100 and 200 may be shared and connected to a serial data and a serial clock pin of the OIS controller IC 300, and a power pin VDD and a ground pin GND of each of the actuator movement sensing elements 100 and 200 may be shared or only one of the power pin VDD and the ground pin GND may be shared.

As described above, when the plurality of actuator movement sensing elements 100 and 200 constituting the camera module and the OIS controller IC 300 transmit and receive data through the two-wire interface method, the number of physical pins and the number of lines connecting the camera module CM to the OIS controller IC 300 are minimized so that advantages of convenience in designing and manufacturing a flexible printed circuit board (FPCB) may be obtained.

Figure 4:
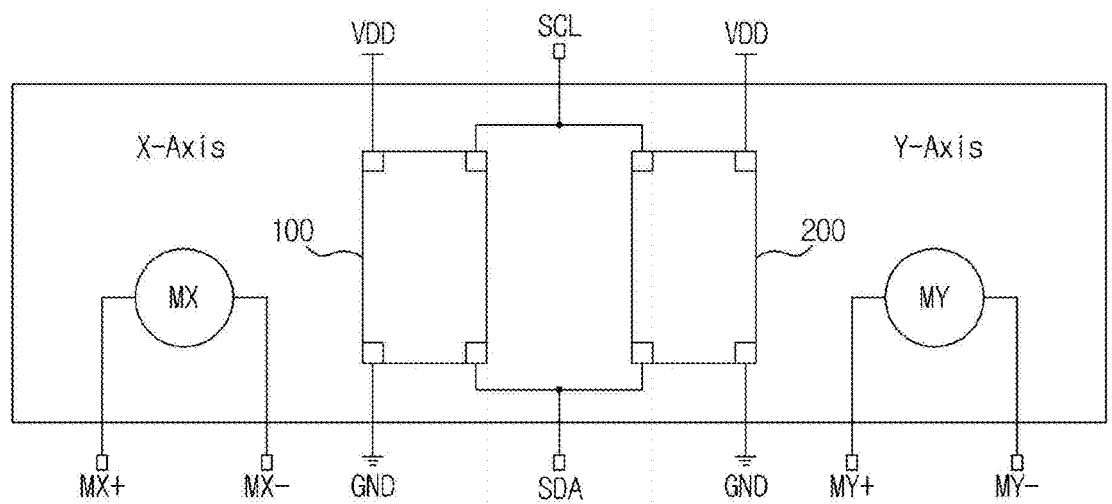
FIG. 4 is an exemplary diagram illustrating a pin connection state between a plurality of actuator movement sensing elements 100 and 200 and the camera module CM including actuator driving coils MX and MY.

To describe the above description in detail with reference to FIG. 4, FIG. 4 illustrates a pin connection state of the camera module CM including the plurality of actuator movement sensing elements 100 and 200 and the actuator driving coils MX and MY.

Referring to FIG. 4, the actuator movement sensing elements 100 and 200 for sensing movement distances of the actuator in the x-axis and y-axis directions and the actuator driving coils MX and MY are included in the camera module to which the actuator movement sensing elements 100 and 200 for a camera module according to the embodiment of the present invention are applied.

Thus, a total of eight pins, which include four pins MX+, MX−, MY+, and MY− required to drive the actuator driving coils MX and MY, two two-wire interface pins SCL and SDA for data interfacing with the OIS controller IC 300, one common power supply pin VDD, and one common ground pin GND, are required. When compared to the number of pins connecting the conventional camera module to the OIS controller IC, three pins may be omitted such that the number of pins may be reduced when the camera module is manufactured. Consequently, convenience in designing and manufacturing the FPCB may be provided.

Hereinafter, the actuator movement sensing elements 100 and 200 for a camera module, which are accommodated in the camera module, will be further described with reference to FIGS. 5 and 6.

Figure 5:
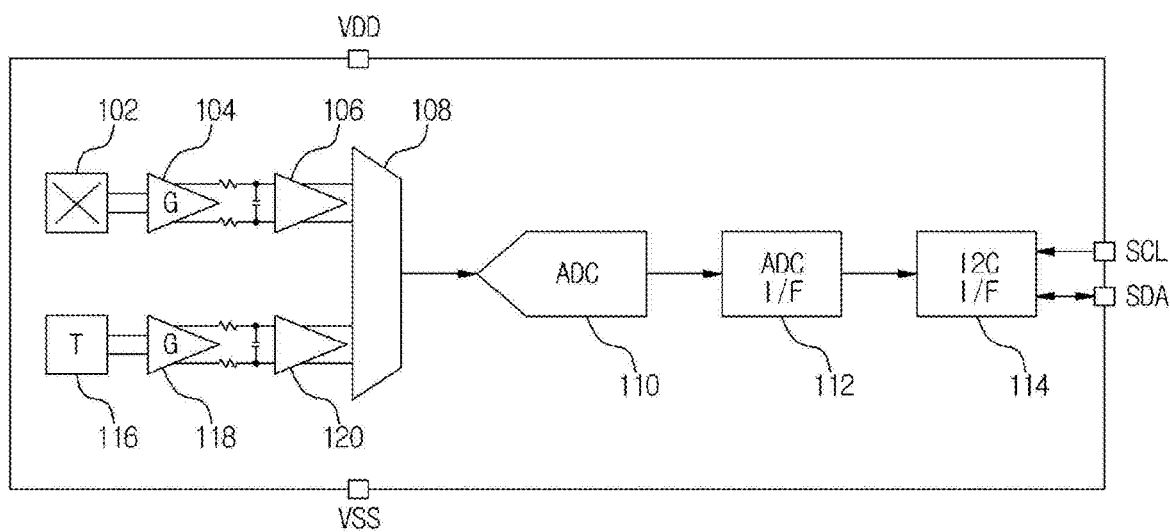
FIGS. 5 and 6 are schematic block diagrams illustrating the actuator movement sensing element shown in FIG. 3.
Figure 6:
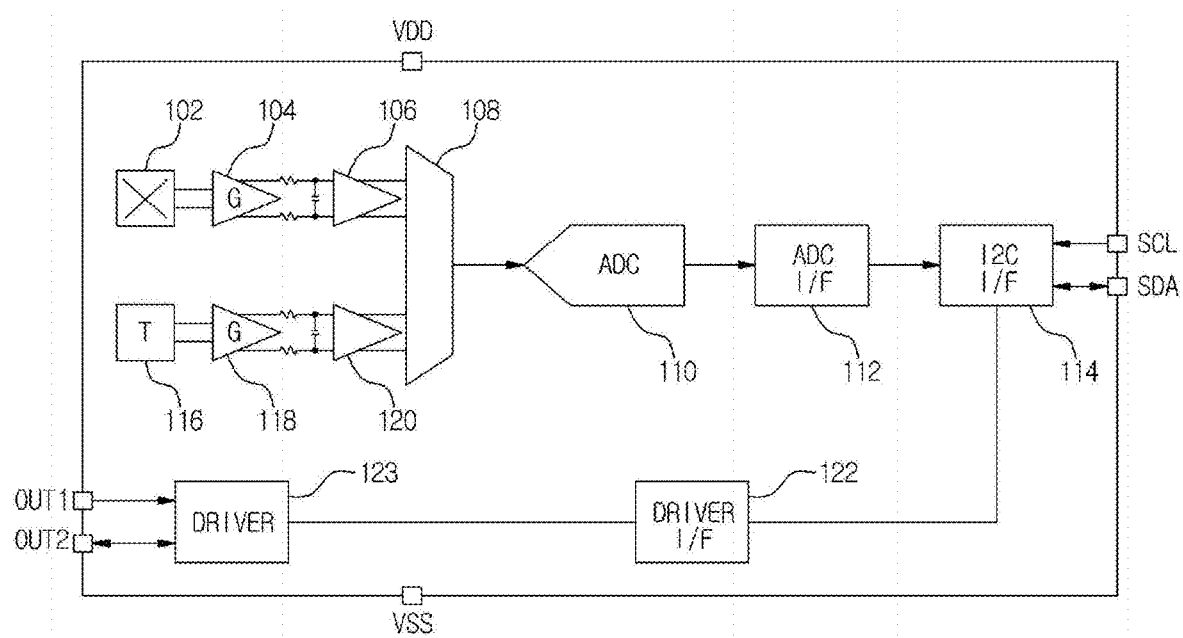

As shown in FIG. 5, each of the actuator movement sensing elements 100 and 200 for a camera module according to the embodiment of the present invention, which is implementable with a digital sensor, includes
a Hall sensor 102 for sensing a movement distance of the actuator in the x-axis or y-axis direction perpendicular to the optical axis (z-axis) direction of the actuator to which the lens assembly is coupled,
a first signal preprocessor for amplifying (in an amplifier 104) an actuator movement distance sensing signal output from the Hall sensor 102, removing noise (in an RC filter), and converting into actuator movement distance sensing data in a digital form (in an analog-to-digital converter (ADC) and an ADC interface (I/F)), and
an interface (I2C I/F) 114 for transmitting the actuator movement distance sensing data to the OIS controller IC 300 in a two-wire interface method.

The Hall sensor 102, the first signal preprocessor, and the interface 114 may be packaged in a digital one-chip IC.

Further, in order to sense a temperature of the actuator in the camera module, each of the actuator movement sensing elements 100 and 200 for a camera module, which has the above-described configuration, may further include a temperature sensing sensor 116 for sensing an ambient temperature of the actuator,
a second signal preprocessor for amplifying (in an amplifier 118) a temperature sensing signal output from the temperature sensing sensor 116 and removing noise (in an RC filter), and
a multiplexer 108 for selectively outputting one of the actuator movement distance sensing signal from which noise is removed and the temperature sensing signal from which noise is removed to a digital conversion part (the ADC) of the first signal preprocessor according to a control period.

In this case, the Hall sensor 102, the first signal preprocessor (including 104, the RC filter, and 106), the interface 114, the temperature sensing sensor 116, the second signal preprocessor (including 118, the RC filter, and 120), the multiplexer 108, and digital conversion parts 110 and 112 may be packaged in a digital one-chip IC.

Hereinafter, operations of the above-described actuator movement sensing elements 100 and 200 will be described in detail. In some cases, as shown in FIG. 6, the configuration of each of the above-described two examples may further include an actuator driver 123 for generating an actuator drive signal according to the actuator drive control data transmitted from the OIS controller IC 300 through the interface 114 and outputting the actuator drive signal to the actuator. In this case, it is assumed that the interface 114 includes a driver interface 122 for interfacing with the actuator driver 123. As described above, the actuator driver 123 may also be packaged in a digital one-chip IC together with various components constituting the actuator movement sensing elements 100 and 200.

Hereinafter, operations of the above-described actuator movement sensing elements 100 and 200 will be described in detail.

First, when the actuator to which the lens assembly is coupled moves in the x-axis and/or y-axis direction perpendicular to the optical axis (z-axis), each of the Hall sensors 102 sense a movement distance of the actuator in the x- or/and y-axis direction and output the movement distance. Then, the actuator movement distance sensing signal is amplified by the amplifier 104, noise is removed in the RC filter, and the actuator movement distance sensing signal bypasses through the driver 106 and is applied to the multiplexer 108.

Meanwhile, when the temperature sensing sensor 116 is provided in the camera module, when the temperature sensing sensor 116 detects and outputs an ambient temperature of the actuator, and when a temperature sensing signal is also amplified by the amplifier 118, noise is removed by the RC filter, and then the temperature sensing signal bypasses through the driver 120 to be applied to the multiplexer 108.

Accordingly, the actuator movement distance sensing signal and the temperature sensing signal of different channels applied to the multiplexer 108 are transmitted to the interface 114, which transmits data in the two-wire interface method, according to a control period through the ADC 110 and the ADC I/F 112 which are the digital conversion parts.

Thus, the interface 114 may transmit digitally converted actuator movement distance sensing data or digitally converted temperature sensing data to the OIS controller IC 300 as serial data according to a serial clock SCL in the following various methods.

Figure 7:
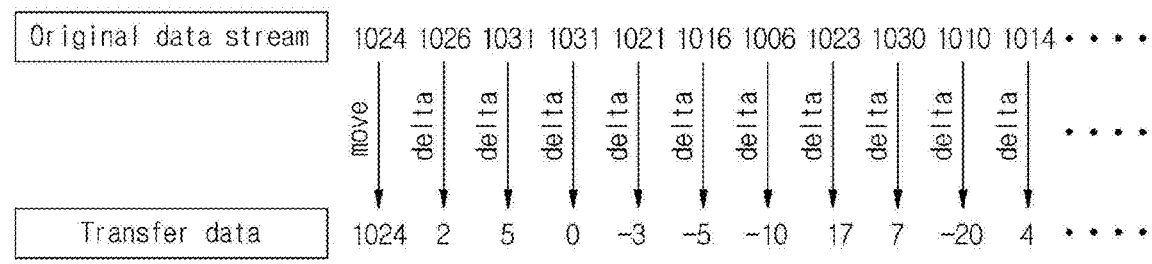
FIG. 7 is an exemplary diagram for describing a process of compressing data for data transmission according to an embodiment of the present invention.

FIG. 7 is an exemplary diagram for describing a process of compressing data for data transmission according to an embodiment of the present invention, and FIGS. 8 to 11 illustrate a data transmission flow for describing a data transmission method according to an embodiment of the present invention.

Referring to FIG. 7, in the embodiment of the present invention, a two-wire interface standard is employed and a data compression technique is used to transmit data without data loss while maintaining the existing communication rate.

In other words, in a first transmission section which should transmit each piece of axial movement distance sensing data of the actuator to the OIS controller IC 300, each piece of axial movement distance sensing data sensed through the actuator movement sensing elements 100 and 200 is transmitted without correction, i.e., as shown in FIG. 7, original data "1024" is directly transmitted to the OIS controller IC 300.

Further, in a transmission section next to the first transmission section, only an increment between the previously transmitted axial movement distance sensing data and currently sensed axial movement distance sensing data with respect to each axis is set as axial movement distance sensing data and the axial movement distance sensing data is transmitted.

For example, as shown in FIG. 7, when axial movement distance sensing data, which should be transmitted first, is "1024" and axial movement distance sensing data, which should be transmitted second, is "1026," the original data "1024" (which is indicated as transfer data) is transmitted in the first transmission section, only an increment of "2" is transmitted in a second transmission section, and only an increment of "5" is transmitted in a third transmission section. Thus, an amount of data which should be transmitted may be reduced such that the axial movement distance sensing data, which is position information of the actuator, may be transmitted normally while the two-wire interface standard is satisfied and newly added information, such as temperature sensing data in the camera module CM, may be transmitted together with as well.

Figure 15:
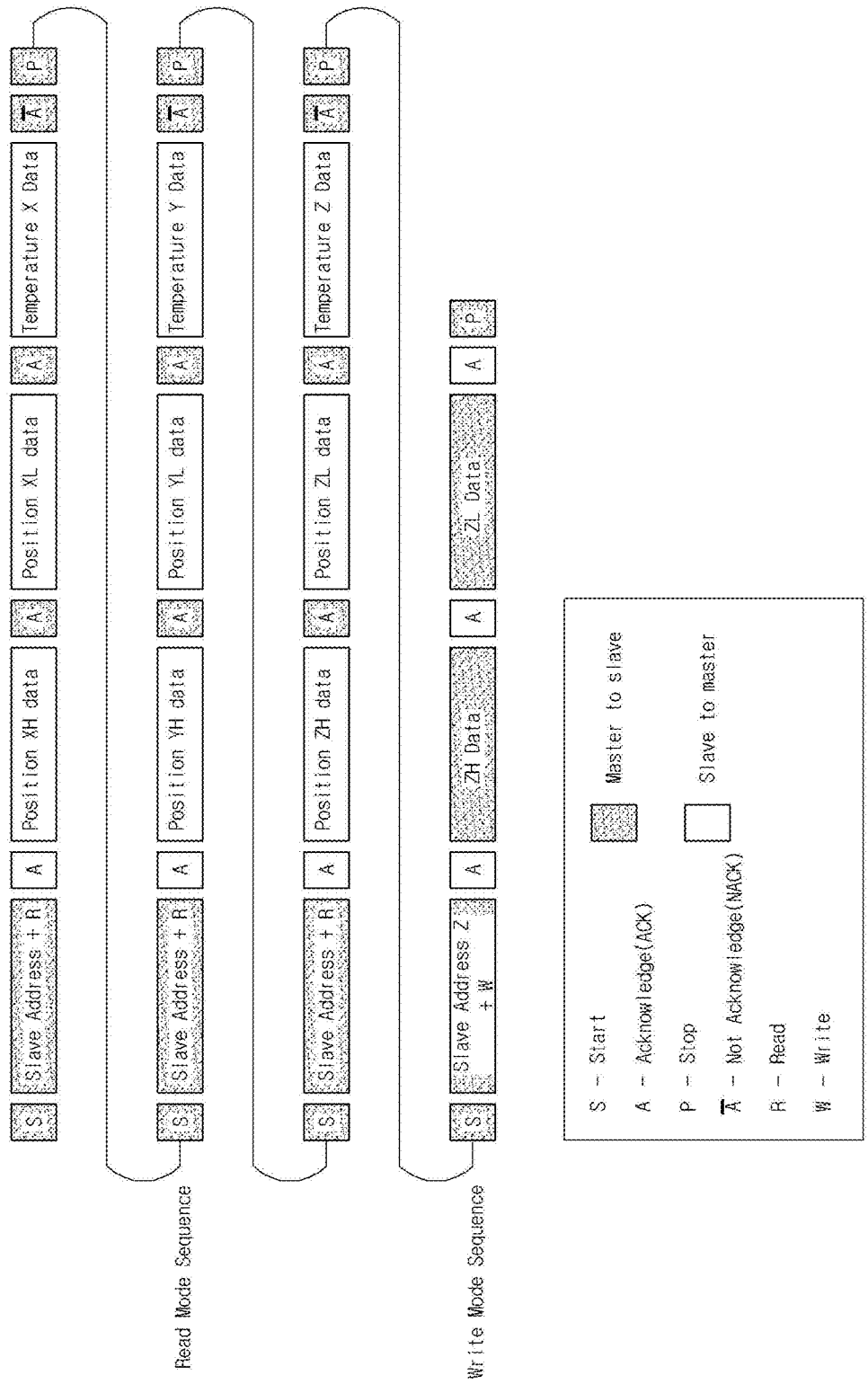

Hereinafter, the method of transmitting compressed data shown in FIG. 7 will be described in detail with reference to FIGS. 8 and 15.

First, in the first transmission section which should transmit each piece of axial movement distance sensing data of the actuator to the OIS controller IC 300, the actuator movement sensing elements 100 and 200 delay pieces of axial movement distance sensing data, which are sensed by the Hall sensors, for specified times without correction and then sequentially transmit the pieces of axial movement distance sensing data in the two-wire interface method.

Figure 8:
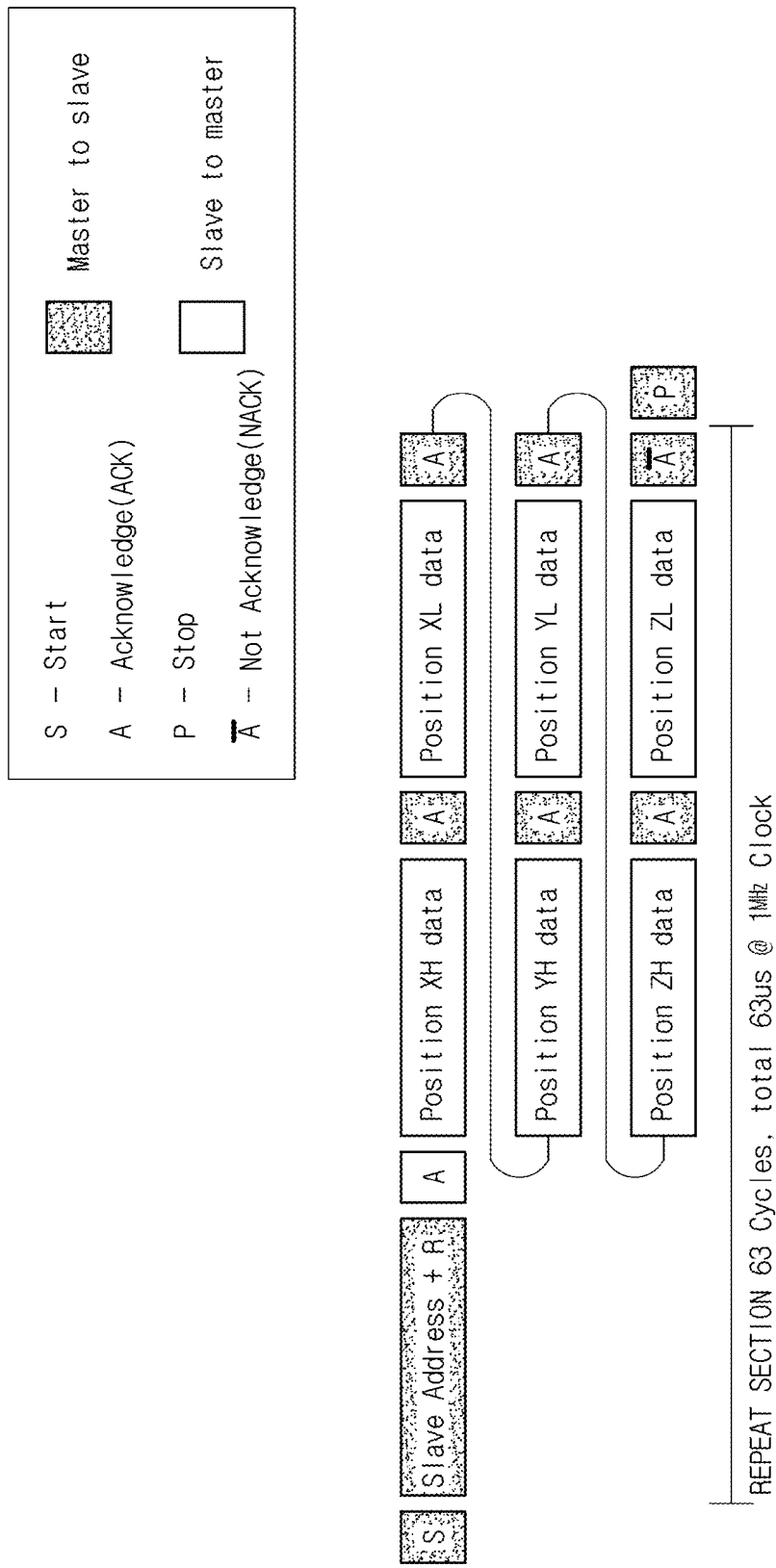
FIGS. 8 to 15 are exemplary diagrams of a data transmission flow for describing a data transmission method according to an embodiment of the present invention.

More specifically, as shown in FIG. 8, when the OIS controller IC 300 corresponding to a master controller transmits a slave address, which is the same as that of a communication initiation signal S (start), to each of the plurality of actuator movement sensing elements, each of the plurality of actuator movement sensing elements (e.g., assigned to the x-axis, y-axis, and z-axis) receives the communication initiation signal and then counts an acknowledge A transmitted from the OIS Controller IC 300 through a clock timing count or in the two-wire interface method, and, when the count of the acknowledge A reaches a predetermined time (i.e., after the specified time), each of the plurality of actuator movement sensing elements transmits the axial movement distance sensing data, which is sensed by the Hall sensor, in the two-wire interface method.

Thus, as shown in FIG. 8, axial movement distance sensing data (position XH data and position XL data) in the x-axis direction is transmitted from the actuator movement sensing element 100 to the OIS controller IC 300, axial movement distance sensing data (position YH data and position YL data) in the y-axis direction, which is transmitted from the actuator movement sensing element 200, is subsequently transmitted to the OIS controller IC 300, and then axial movement distance sensing data (position ZH data and position ZL data) in the z-axis direction, which is transmitted from an actuator movement sensing element (not shown) for sensing movement of the actuator in the z-axis direction, is transmitted to the OIS controller IC 300.

Figure 9:
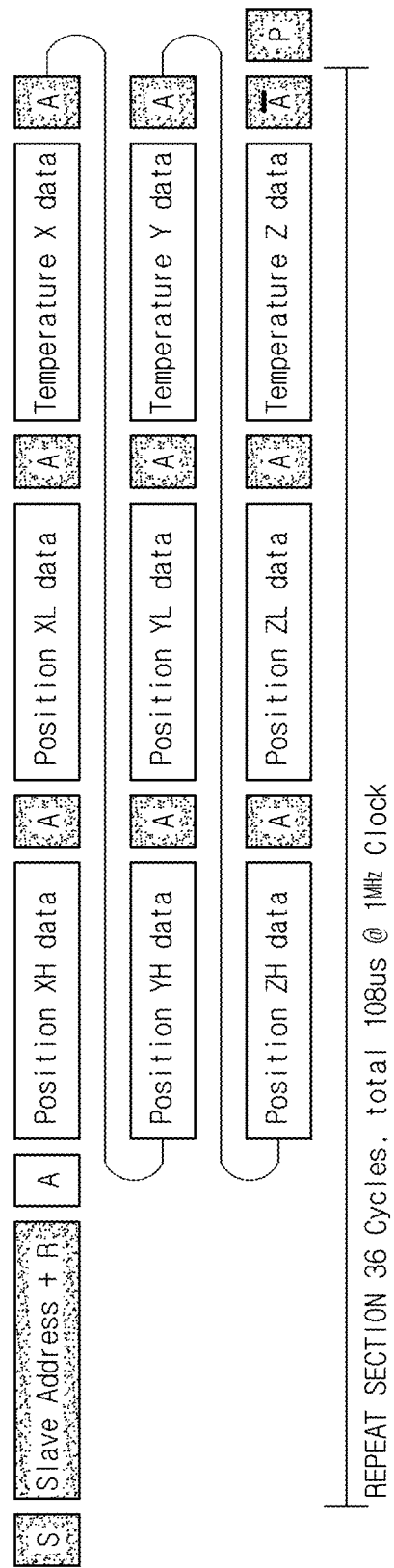

As shown in FIG. 9, when a temperature sensing sensor is included in the camera module, temperature sensing data (temperature X (Y or Z) data) sensed through the temperature sensing sensor is transmitted following each piece of axial movement distance sensing data (e.g., position XH data and position XL data) without correction.

Hereinafter, a case in which data is transmitted in a subsequent second transmission section next to the first transmission section will be described.

First, in the subsequent transmission section next to the first transmission section, each actuator movement sensing element sets only an increment between the previously transmitted axial movement distance sensing data in each axis and currently sensed axial movement distance sensing data as each piece of axial movement distance sensing data, delays each piece of axial movement distance sensing data for a specified time (preferably, a time having a value that is smaller than that of the specified time mentioned in the first transmission section), and then sequentially transmit each piece of axial movement distance sensing data in the two-wire interface method.

Figure 10:
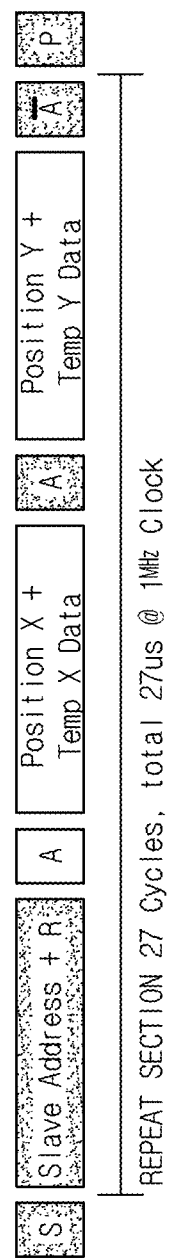

For example, when only two actuator movement sensing elements 100 and 200 are provided as shown in FIG. 3, as shown in FIG. 10, the interface 114 of the actuator movement sensing element 100 receives the communication initiation signal S, counts a clock timing, and then transmits the axial movement distance sensing data in the x-axis direction (position X data corresponding to an increment) to the OIS controller IC 300 at the specified time, and the actuator movement sensing element 200 also receives the communication initiation signal S, counts the clock timing, and then transmits the axial movement distance sensing data in the y-axis direction (position Y data corresponding to an increment) next to the axial movement distance sensing data in the x-axis direction (position X data) to the OIS controller IC 300 at the specified time.

When the temperature sensing sensor is included in the camera module, as shown in FIG. 10, temperature sensing data (temp X (Y or Z) data) may be transmitted following the axial movement distance sensing data (position X (Y or Z) data) corresponding to the increment in each axial direction.

Figure 11:
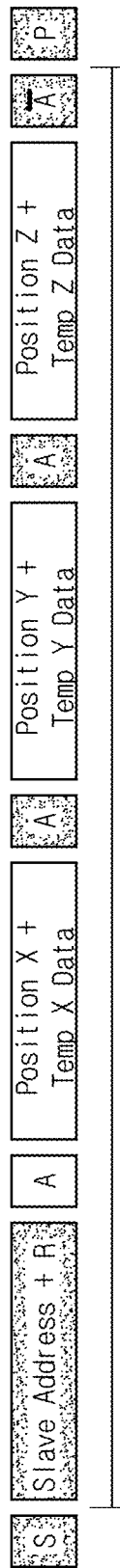

Further, when the actuator movement sensing element for sensing a movement distance in the optical axis (z-axis) direction is further included, as shown in FIG. 11, each actuator movement sensing element may transmit the axial movement distance sensing data (position X, Y, or Z data) corresponding to the increment according to a time specified to each actuator movement sensing element in the same method as described in FIG. 10. When the temperature sensing sensor is included, each actuator movement sensing element may transmit the temperature sensing data next to the axial movement distance sensing data.

Hereinafter, another variant embodiment of the present invention will be described in detail.

In the first transmission section which should transmit each piece of axial movement distance sensing data of the actuator to the OIS controller IC 300, the actuator movement sensing elements 100 and 200 delay pieces of axial movement distance sensing data, which are sensed by the Hall sensors, for specified times without correction and then sequentially transmit the pieces of axial movement distance sensing data in the two-wire interface method.

Figure 12:
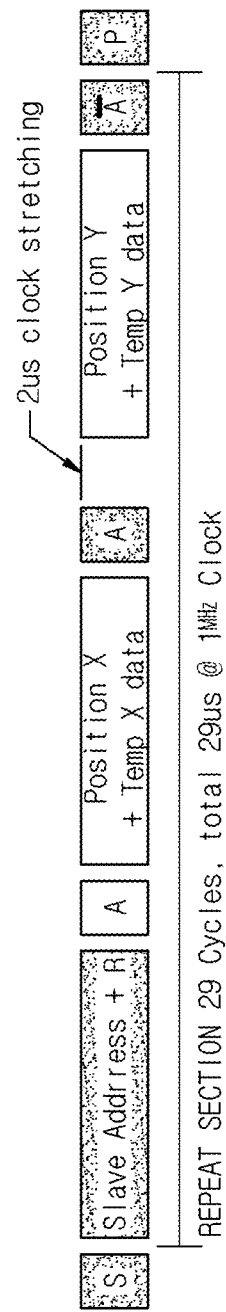

Further, as shown in FIG. 12, in the subsequent transmission section next to the first transmission section, each actuator movement sensing element sets only an increment between the previously transmitted axial movement distance sensing data in each axis and currently sensed axial movement distance sensing data as each piece of axial movement distance sensing data, delays each piece of axial movement distance sensing data for the specified time, and then sequentially transmits each piece of axial movement distance sensing data in the two-wire interface method. However, as shown in FIGS. 12 and 13, in the embodiment, the specified time is a time including a clock stretching section.

Specifically, as shown in FIG. 12, the interface 114 of the actuator movement sensing element 100 receives the communication initiation signal S, counts a clock timing, and then transmits the axial movement distance sensing data in the x-axis direction (position X data corresponding to the increment) to the OIS controller IC 300 at the specified time, and the actuator movement sensing element 200 also receives the communication initiation signal S, counts the clock timing, and then transmits, following two clock stretching sections after the transmission of the axial movement distance sensing data in the x-axis direction (position X data) is completed, the axial movement distance sensing data in the y-axis direction (position Y data corresponding to an increment) to the OIS controller IC 300. When the temperature sensing sensor is included in the camera module, the temperature sensing data (temp X data or temp Y data) may be transmitted following each piece of axial movement distance sensing data.

Figure 13:
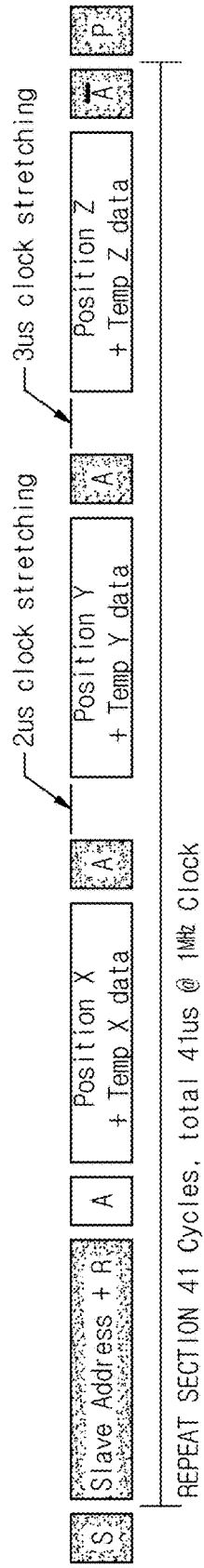

Further, when the actuator movement sensing element for sensing a movement distance in the optical axis (z-axis) direction is further included, as shown in FIG. 13, each actuator movement sensing element may transmit the axial movement distance sensing data (position X, Y, or Z data) corresponding to the increment according to a time specified to each actuator movement sensing element in the same method as described in FIG. 12. When the temperature sensing sensor is included, each actuator movement sensing element may transmit the temperature sensing data (temp X, Y, or Z data) next to the axial movement distance sensing data. For reference, the reason for the clock stretching section in FIG. 13 having a difference from the clock stretching section shown in FIG. 12 is that the clock stretching section in FIG. 13 is used for the purpose of distinguishing the z-axis direction different from the y-axis in the OIS controller IC 300.

When the camera module CM and the OIS controller IC 300 serving as a controller module for shake correction transmit data in the above-described two-wire interface method, the number of pins connecting the actuator movement sensing elements 100 and 200 to the OIS controller IC is reduced such that convenience in designing and manufacturing the FPCB as well as the camera module may be provided, the axial movement distance sensing data, which is the position information of the actuator, may be transmitted normally while the two-wire interface standard is satisfied, and newly added information such as the temperature sensing data in the camera module CM may also be transmitted.

Meanwhile, in the above embodiments, the method in which the axial movement distance sensing data (and the temperature sensing data) in the x-axis, the y-axis, and, in some cases, the z-axis, is sequentially transmitted have been described. In some cases, this may be defined as a sequential mode.

A select mode different from the sequential mode may be defined. For example, the actuator movement distance sensing data and the temperature sensing data in the z-axis direction may be transmitted following those in the x-axis direction, and, subsequently, the actuator movement distance sensing data and the temperature sensing data in the y-axis direction may be transmitted. Since the OIS controller IC 300 may count a reception time of the received axial movement distance sensing data, the acknowledgment signal A transmitted to the actuator movement sensing elements 100 and 200, or a clock stretching size which is present between the axial movement distance sensing data to identify an axial direction of the received data, data sensed in the camera module CM may be transmitted through the select mode instead of the sequential mode.

Figure 14:
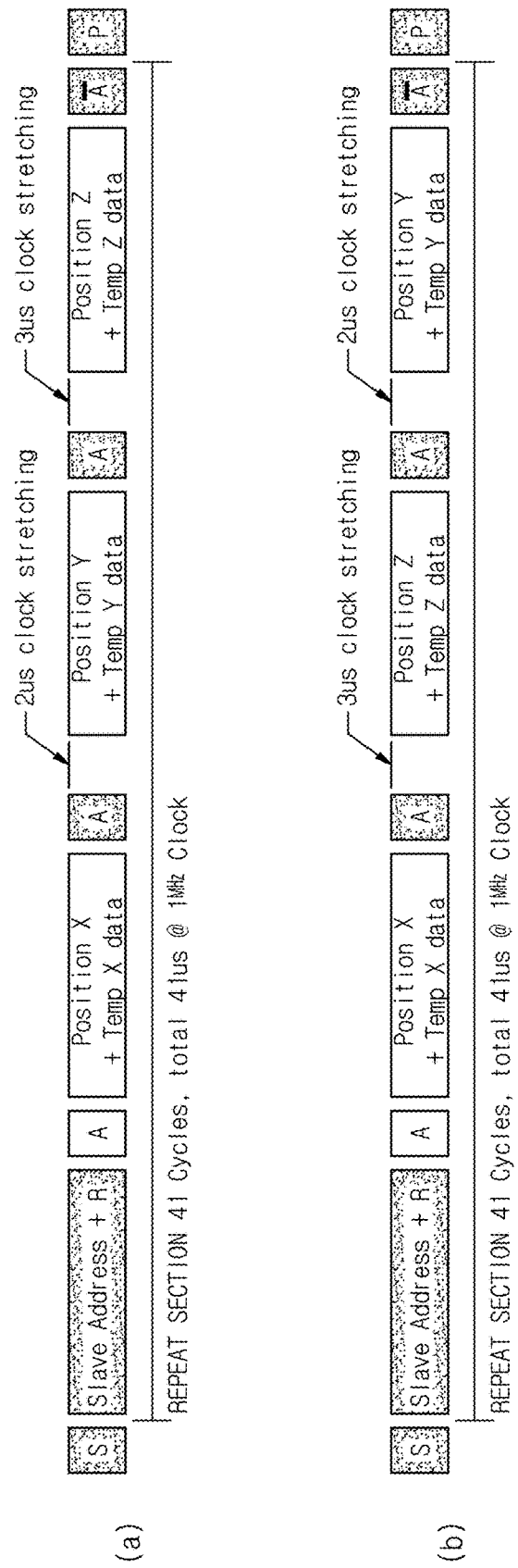

For reference, FIG. 14A illustrates an example in which three pieces of axial movement distance sensing data and temperature sensing data are transmitted in the sequential mode, and FIG. 14B illustrates an example in which the three pieces of axial movement distance sensing data and the temperature sensing data are transmitted in the select mode.

As another data transmission method, a position repeat mode may be defined and used. To describe the position repeat mode in detail, comparing a variation in position of the actuator and a variation in temperature in the camera module CM, the variation in temperature is relatively slow. Thus, after axial movement distance sensing data indicating a variation in position of the actuator is repeatedly transmitted, temperature sensing data may be transmitted.

That is, the interface 114 of each of the actuator movement sensing elements 100 and 200 may transmit data in a method of receiving a communication initiation signal, repeatedly transmit axial movement distance sensing data corresponding to an increment at a specified time, and then transmit temperature sensing data (temp X data) (position X, position X, position Y, position Y, temp X, position X, position X, position Y, position Y, and temp Y).

Alternatively, when the increment of the axial movement distance sensing data exceeds a set threshold, detected axial movement distance sensing data may be repeatedly transmitted instead of the increment, or the set threshold may be repeatedly transmitted and, subsequently, an increment with respect to previously transmitted temperature sensing data may be transmitted. In this case, in order to distinguish x-axial movement distance sensing data from y-axial movement distance sensing data, the specified time may be adjusted such that a two-clock stretching section is present, and, in order to distinguish the y-axial movement distance sensing data from z-axial movement distance sensing data, the specified time may be adjusted such that a three-clock stretching section is present, and, in order to distinguish the axial movement distance sensing data from temperature sensing data, the specified time may be adjusted such that a four-clock stretching section is present.

For reference, when a driver for driving the actuator is embedded in the actuator movement sensing element sensing the z-axis which is the optical axis, the actuator drive control data may be transmitted from the OIS controller IC 300 to a z-axis actuator movement sensing element in the two-wire interface method. FIG. 15 illustrates a data transmission method for the above-described case. In FIG. 15, "R" indicates a read mode and "W" indicates a write mode.

As described above, the actuator movement sensing element according to the embodiment of the present invention includes the Hall sensor 102 for sensing a movement distance of the actuator in the x-axis or y-axis direction perpendicular to the optical axis (z-axis) direction of the actuator to which the lens assembly is coupled, the first signal preprocessor for amplifying the actuator movement distance sensing signal which is output from the Hall sensor 102, removing noise, and converting into the actuator movement distance sensing data in a digital form, and the interface 114 for transmitting the actuator movement distance sensing data to the OIS controller IC 300 in the two-wire interface method. Therefore, the camera module including the above-described actuator movement sensing element requires only a total of eight pins which include the four pins MX+, MX−, MY+, and MY− connected to the actuator driving coils MX and MY, the two two-wire interface pins SCL and SDA for data interfacing with the OIS controller IC 300, the one common power supply pin VDD, and the one common ground pin GND. Consequently, the number of pins may be reduced when the camera module is manufactured such that convenience in designing and manufacturing the FPCB may be provided.

Furthermore, since the data transmission method of the present invention transmits an entirety of the information (e.g., the axial movement distance sensing data and the temperature sensing data), which should be transmitted, at an initial stage (the first transmission section) and then compares previous information with current information to transmit only a varied increment, there is an advantage in that the data transmission method can be free from the need for faster transmission rate or longer transmission time as the information which should be transmitted is increased.

Further, in the data transmission method of the present invention, the axial data transmitted by reading identification information (a clock stretching time) at a data receiving end can be distinguished, and, in some cases, a priority of data which is should be transmitted can be determined as well.

Taken together, the present invention is useful for providing the advantage of transmitting and receiving newly added information or data normally without increasing the communication rate while following the transmission standard of the two-wire interface method which minimizes the physical connection between data transmission entities.

Further, in accordance with the present invention, although the plurality of actuator movement sensing elements are physically separated, the plurality of actuator movement sensing elements have the same slave address to operate as one chip such that an effect of preventing degradation in communication rate, which is generated due to a time for reading a slave address, can be provided. Alternatively, as a modification of the present invention, different slave addresses may be assigned to actuator movement sensing elements to transmit data in the above-described two-wire interface method.

While the present invention has been described with reference to the embodiments shown in the drawings, these embodiments are merely illustrative and it should be understood that various modifications and equivalent other embodiments can be derived by those skilled in the art to which the present invention pertains. For example, in the embodiments of the present invention, the sensing element for sensing the movement distance of the actuator in the x-axis or y-axis direction perpendicular to the optical axis (z-axis) direction of the actuator to which the lens assembly is coupled has been mainly described, but the embodiments of the present invention may also be applied to a sensing element for sensing a movement distance of the actuator in the optical axis direction without any modification. Further, a period and a clock frequency of the data transmission section shown in the accompanying drawings are only examples and may be variously changed according to a system implementation method. Therefore, the true technical scope of the present invention should be defined by the appended claims.

What is claimed is:

1. A method of transmitting data in a two-wire interface method by a plurality of actuator movement sensing elements, each having a Hall sensor for sensing a movement distance of an actuator in an optical axis (z-axis) or any one direction of an x-axis direction and a y-axis direction perpendicular to the optical axis (z-axis) of the actuator to which a lens assembly is coupled and by a controller module for shake correction, the method comprising:

in a first transmission section in which each piece of axial movement distance sensing data of the actuator should be transmitted to the controller module for shake correction, a first operation of delaying, by each of actuator movement sensing element, axial movement distance sensing data sensed by the Hall sensor for a specified time without correction and then sequentially transmitting the axial movement distance sensing data in the two-wire interface method; and in a subsequent transmission section next to the first transmission section, a second operation of setting, by each of actuator movement sensing element, only an increment between previously transmitted axial movement distance sensing data in each axis and currently sensed axial movement distance sensing data as each piece of axial movement distance sensing data, delaying each piece of axial movement distance sensing data for the specified time, and then sequentially transmitting each piece of axial movement distance sensing data in the two-wire interface method.

2. The method of claim 1, wherein, when a temperature sensing element is included in a camera module, in the first operation, temperature sensing data sensed by the temperature sensing element is transmitted following each piece of axial movement distance sensing data without correction, and, in the second operation, only an increment with respect to previously transmitted temperature sensing data is transmitted following each piece of axial movement distance sensing data.

3. The method of claim 2, wherein slave addresses of the plurality of actuator movement sensing elements have the same address.

4. The method of claim 2, wherein, when an increment of the axial movement distance sensing data exceeds a set threshold in the second operation, the set threshold is repeatedly transmitted or the detected axial movement distance sensing data is repeatedly transmitted instead of the increment of the axial movement distance sensing data and then the increment with respect to the previously transmitted temperature sensing data is subsequently transmitted.

5. The method of claim 4, wherein, when the temperature sensing element is included in the camera module, in the first operation, the temperature sensing data sensed by the temperature sensing element is transmitted following each piece of axial movement distance sensing data which is repeatedly transmitted.

6. The method of claim 1, wherein each axial direction of the actuator includes the x-axis or y-axis direction perpendicular to the optical axis (z-axis) direction of the actuator to which the lens assembly is coupled, and pieces of axial movement distance sensing data in the x-axis and y-axis are sequentially transmitted in the first and second operations.

7. The method of claim 6, wherein slave addresses of the plurality of actuator movement sensing elements have the same address.

8. The method of claim 1, wherein each axial direction of the actuator includes the optical axis (z-axis) direction of the actuator to which the lens assembly is coupled or the x-axis or y-axis direction perpendicular to the optical axis direction, and pieces of axial movement distance sensing data in the x-axis, y-axis, and z-axis are sequentially transmitted in the first and second operations.

9. The method of claim 8, wherein slave addresses of the plurality of actuator movement sensing elements have the same address.

10. The method of claim 1, wherein each axial direction of the actuator includes the optical axis (z-axis) or the x-axis or y-axis direction perpendicular to the optical axis (z-axis) direction of the actuator to which the lens assembly is coupled, and pieces of axial movement distance sensing data in the x-axis, z-axis, and y-axis are sequentially transmitted in the first and second operations.

11. The method of claim 10, wherein slave addresses of the plurality of actuator movement sensing elements have the same address.

12. The method of claim 1, wherein slave addresses of the plurality of actuator movement sensing elements have the same address.

13. The method of claim 1, wherein, when an increment of the axial movement distance sensing data exceeds a set threshold in the second operation, the set threshold is repeatedly transmitted or the detected axial movement distance sensing data is repeatedly transmitted instead of the increment and then an increment with respect to previously transmitted temperature sensing data is subsequently transmitted.

14. The method of claim 13, wherein, when a temperature sensing element is included in a camera module, in the first operation, temperature sensing data sensed by the temperature sensing element is transmitted following each piece of axial movement distance sensing data which is repeatedly transmitted.

* * * * *